(12) United States Patent
Uematsu et al.

(10) Patent No.: US 7,097,186 B2
(45) Date of Patent: Aug. 29, 2006

(54) INDUSTRIAL VEHICLE HAVING BODY STRUCTURE

(75) Inventors: Shuo Uematsu, Kariya (JP); Hiroshi Kobayashi, Kariya (JP); Takahito Miyake, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 335 days.

(21) Appl. No.: 10/798,813

(22) Filed: Mar. 10, 2004

(65) Prior Publication Data

US 2004/0188994 A1 Sep. 30, 2004

(30) Foreign Application Priority Data

Mar. 11, 2003 (JP) ............................... 2003-064632

(51) Int. Cl.
*B60G 9/02* (2006.01)
(52) U.S. Cl. ............................ 280/124.112; 280/759; 414/719
(58) Field of Classification Search ............... 280/98, 280/104, 6.154, 759, 758, 124.103, 124.106, 280/124.111, 124.112, 124.157–124.161, 280/124.154; 414/719
See application file for complete search history.

(56) References Cited

U.S. PATENT DOCUMENTS

| | | | | |
|---|---|---|---|---|
| 2,178,367 A | * | 10/1939 | Dunham | ..................... 414/635 |
| 2,256,314 A | * | 9/1941 | Dunham | ..................... 180/54.1 |
| 2,561,300 A | * | 7/1951 | Walker | ..................... 187/222 |
| 4,090,579 A | * | 5/1978 | Stedman | ..................... 180/69.2 |
| 4,093,259 A | * | 6/1978 | Stedman | ..................... 280/755 |
| 4,471,975 A | * | 9/1984 | Sorlie et al. | ................. 280/759 |
| 6,398,242 B1 | | 6/2002 | Niwa et al. | ............. 280/124.11 |
| 2002/0117816 A1 | * | 8/2002 | Dudding et al. | ......... 280/6.151 |

FOREIGN PATENT DOCUMENTS

| | | |
|---|---|---|
| JP | 2000-6624 | 1/2000 |
| WO | WO 01/81235 | 11/2001 |

* cited by examiner

*Primary Examiner*—Paul N. Dickson
*Assistant Examiner*—Leonard McCreary, Jr.
(74) *Attorney, Agent, or Firm*—Morgan & Finnegan, LLP

(57) ABSTRACT

An industrial vehicle includes a vehicle body, a pair of rear wheels, a rear axle for supporting the rear wheels, a lock cylinder, a counterweight and a coupling portion. The rear axle is supported to be pivotable relative to the vehicle body. The lock cylinder is located between the vehicle body and the rear axle. The lock cylinder limits pivoting of the rear axle. The counterweight forms a rear portion of the vehicle body. The counter weight supports the rear axle. The coupling portion is integrally formed with the counterweight to couple the fluid pressure cylinder with the vehicle body. This reduces the number of components and the manufacturing steps of the industrial vehicle.

14 Claims, 7 Drawing Sheets

INDUSTRIAL VEHICLE HAVING BODY STRUCTURE

BACKGROUND OF THE INVENTION

The present invention relates to an industrial vehicle having a body structure with a counterweight such as a counterbalanced forklift.

The counterbalanced forklift disclosed in, for example, Japanese Laid-Open Patent No. 2000-6624 has a body structure as described below. That is, a rear wheel axle supporting a pair of left and right rear wheels is pivotably supported in a vertical direction with respect to a vehicle body, and a lock cylinder regulating pivoting of the rear wheel axle is supported between a body frame and the rear wheel axle.

Generally, the body frame for the forklift is formed by welding a plurality of plate members. The counterbalanced forklift is provided with voluminous counterweight in the rear of the vehicle body. The rear end of the vehicle frame extends substantially to a position of the rear wheel axle. In the rear of the vehicle body toward the rear of the rear wheel axle, there is arranged a counterweight to be fixed to the rear end of the vehicle frame.

FIGS. 7 to 9 show the body frame 80 of the forklift described in the above-described publication. The body frame 80 has a pair of structures 81a and 81b coupled by a front coupling member 82 and a rear coupling member 83. A first back plate 84 couples rear portions of both structures 81a, 81b with each other. The first back plate 84 is arranged on a plane perpendicular to the fore-and-aft direction of the vehicle.

Each structure 81a, 81b has an extension portion extending toward the rear of the vehicle body. Both extension portions are coupled to each other with a second back plate 85 arranged in parallel with the first back plate 84. Each extension portion is provided with a hanger portion 86 for detachably supporting the counterweight.

The body frame 80 is provided with an axle supporting portion 87 for supporting the rear wheel axle. The axle supporting portion 87 extends from the rear surface of the fist back plate 84 toward the rear, and is coupled with the rear surface of the first back plate 84 and the lower end of the second back plate 85 (see FIG. 8).

Weight of the counterweight supported by both hanger portions 86 is applied to the axle supporting portion 87 via the second back plate 85, and further is applied to both rear wheels from the rear wheel axle supported by the axle supporting portion 87.

As shown in FIG. 9, the body frame 80 has a coupling portion 90 for supporting the lock cylinder 89. The lock cylinder 89 is provided between the coupling portion 90 and the rear wheel axle 88. The coupling portion 90 includes the second back plate 85, an installation plate 91 provided in the rear thereof, and a coupling shaft 92 for supporting the upper end portion of the lock cylinder 89. The lock cylinder 89 is supported by the coupling shaft 92 in the fore-and-aft direction of the vehicle.

For example, when the vehicle abruptly turns, an expansion/contraction operation of the lock cylinder 89 is inhibited, and as a result, pivoting of the rear wheel axle 88 with respect to the body frame 80 is inhibited, and any inclined movement of the vehicle is limited. Since a powerful force is applied to the coupling portion 90 from the lock cylinder 89 at this time, it is necessary to particularly reinforce structural strength of surroundings of the coupling portion 90.

Thus, the second back plate 85 and the installation plate 91 have been made thicker than other plate members constituting the body frame 80, or reinforcement has newly been welded to the second back plate 85 and the installation plate 91. In these cases, the body frame 80 is complicated in structure.

Also, in addition to the basic structural members of the body frame 80, members for coupling the lock cylinder 89 to the body frame 80 such as the installation plate 91 and the reinforcement are required, and the number of components is increased. Further, since it is necessary to weld these members to the body frame 80 with long weld length, the manufacturing steps are increased.

SUMMARY OF THE INVENTION

It is an objective of the present invention to simplify the body structure of an industrial vehicle, and to reduce the number of components and the manufacturing steps of the industrial vehicle.

To achieve the foregoing and other objectives and in accordance with the purpose of the present invention, an industrial vehicle having a vehicle body, a pair of rear wheels, a rear axle, a fluid pressure cylinder, a counterweight, and a coupling portion is provided. The rear axle supports the rear wheels. The rear axle is supported to be pivotable relative to the vehicle body. The fluid pressure cylinder is located between the vehicle body and the rear axle. The fluid pressure cylinder limits pivoting of the rear axle. The counterweight forms a rear portion of the vehicle body. The counter weight supports the rear axle. The coupling portion is integrally formed with the counterweight to couple the fluid pressure cylinder with the vehicle body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, with reference to FIGS. 1 to 6, the description will be provided of an embodiment according to the present invention.

Figure 2:
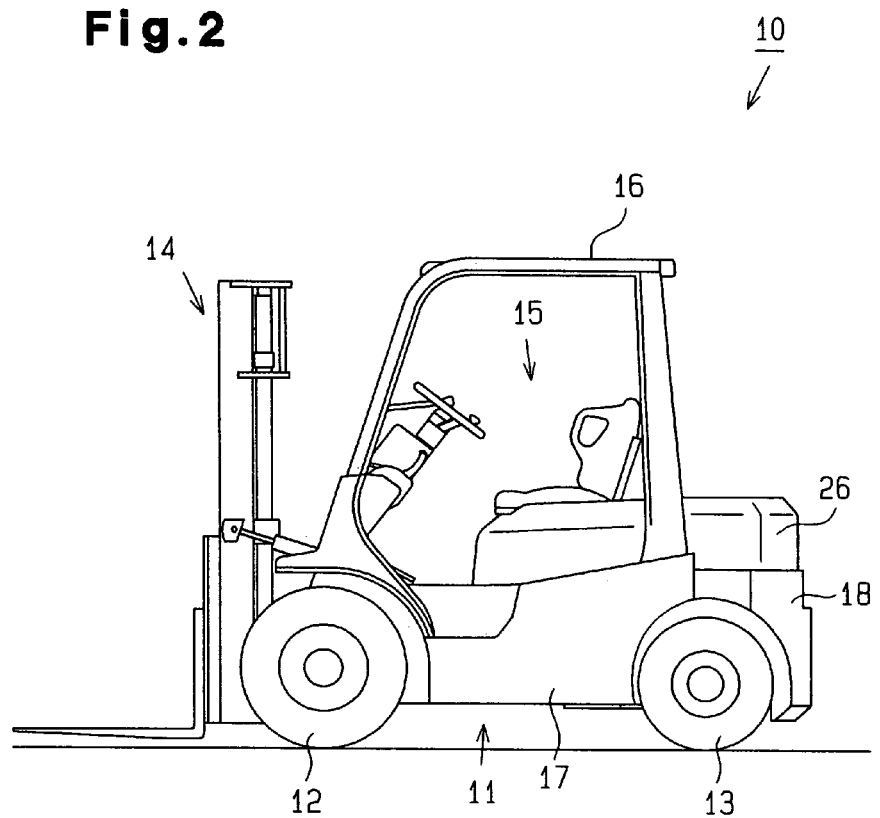
FIG. 2 is a schematic side view showing the forklift.

As shown in FIG. 2, an industrial vehicle, which is a counterbalanced forklift 10, has a pair of front wheels 12

(only one of which is shown) in the front part of the vehicle body 11, and a pair of rear wheels 13 (only one of which is shown) in the rear part of the vehicle body 11. Both front wheels 12 are fixed driving wheels while both rear wheels 13 are steered and driven wheels. The forklift 10 has a mast device 14 on the front side of the vehicle body 11, and has a cabin 15 between both front wheels 12 and both rear wheels 13. On top of the cabin 15, there is provided a head guard 16.

Figure 1:
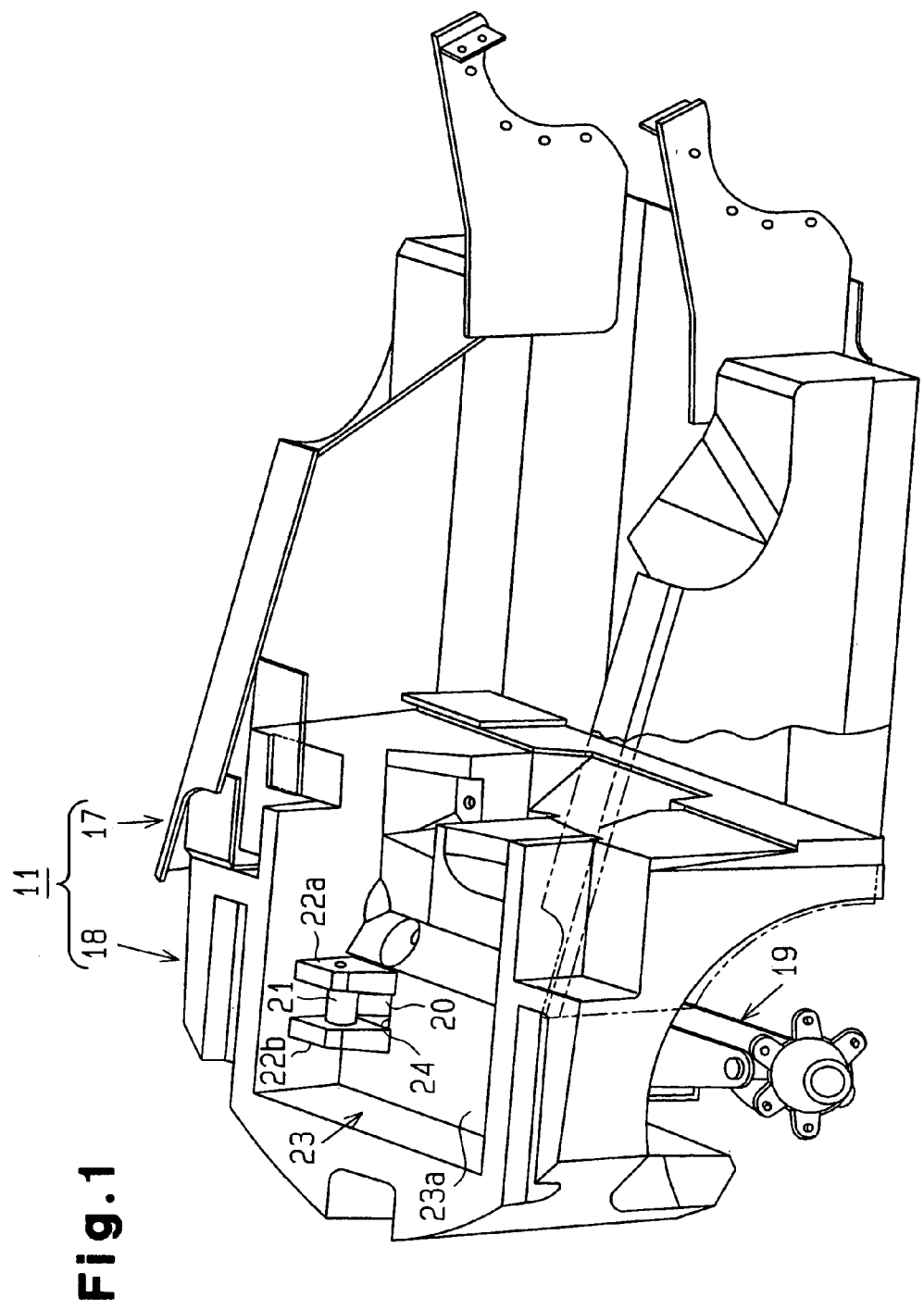
FIG. 1 is a schematic perspective view showing body structure of a forklift according to one embodiment embodying the present invention.
Figure 3:
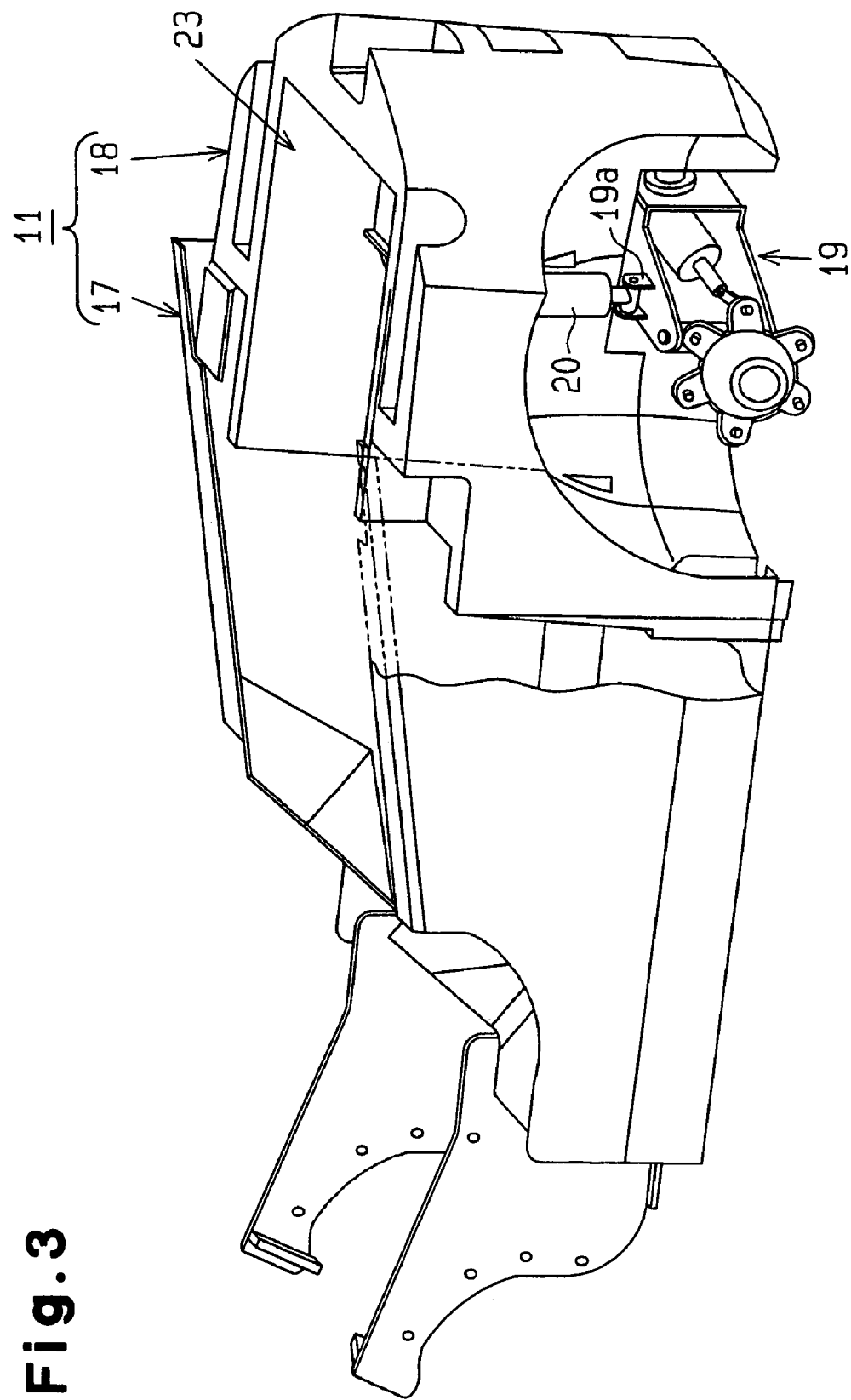
FIG. 3 is a schematic perspective view showing a body structure.

As shown in FIGS. 1 and 3, the vehicle body 11 includes plate assembly 17 for constituting substantially the front part and the counterweight 18 for constituting substantially the rear part.

The plate assembly 17 is formed by welding a plurality of plate members. The plate assembly 17 supports the front wheel axle (not shown) for supporting the both front wheels 12. Within space to be partitioned by the plate assembly 17, there are mounted an engine, a fuel tank, hydraulic loading equipment, engine driving auxiliary equipment and the like which are not shown. The plate assembly 17 constitutes the lower part of the cabin 15, and supports the head guard 16.

The counterweight 18 is integrally cast, and is fixed to the plate assembly 17 by means of a plurality of bolts (not shown). A rear wheel axle 19 has a center pin (not shown), and is supported by the counterweight 18 with the center pin as a center of rotation so as to be pivotable in the vertical direction. The center pin is supported by a supporting portion (not shown) integrally provided with the counterweight 18, or a supporting member (not shown) made of a separate member, cast in the counterweight 18.

Between the counterweight 18 and the rear wheel axle 19, there is provided a lock cylinder 20. In the present embodiment, the lock cylinder 20 is a double-acting type fluid pressure cylinder. A shaft, which is a cylindrical portion 21 in this embodiment, is provided at the upper end of the lock cylinder 20. The cylindrical portion 21 is pivotably coupled with a pair of supporting portions 22a and 22b integrally provided with the counterweight 18. On the other hand, the lower end portion of the lock cylinder 20 is pivotably coupled with a supporting portion 19a provided at the rear wheel axle 19. A solenoid valve (not shown) selectively permits or inhibits supply or discharge of hydraulic fluid to or from the lock cylinder 20. Control of the solenoid valve permits or inhibits the rotation of the lock cylinder 20 in both directions of the rear wheel axle 19 with respect to the vehicle body 11. In the present embodiment, both supporting portions 22a and 22b constitute the coupling portion.

Figure 4:
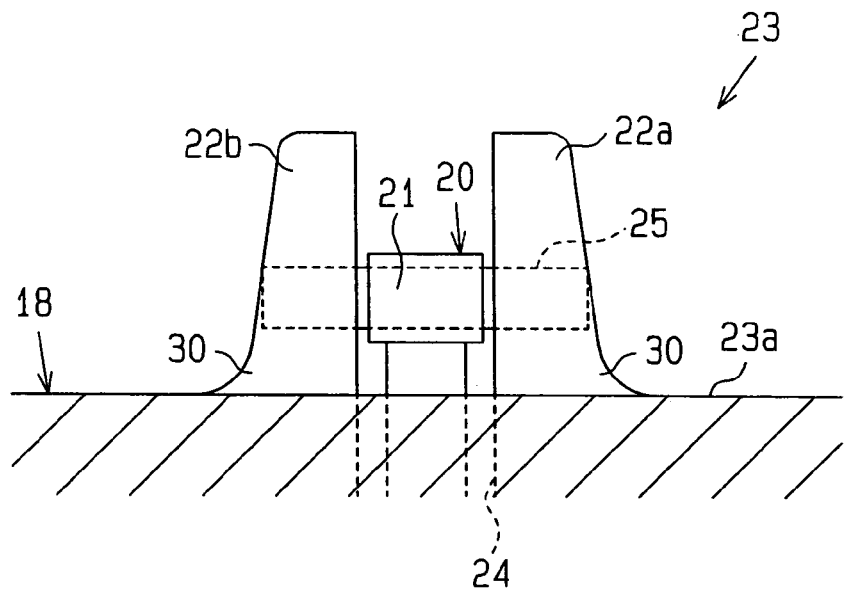
FIG. 4 is a schematic side view showing a supporting portion.

As shown in FIGS. 1 and 4, both supporting portions 22a and 22b are provided on an upper surface 23a for partitioning an accommodation recess 23 provided above the counterweight 18. Both supporting portions 22a and 22b are vertically installed so as to stand side by side in the fore-and-aft direction of the vehicle. The accommodation recess 23 accommodates lower parts of a radiator and a muffler (not shown) which are engine driving auxiliary equipment.

A through-hole 24 extends through the counterweight 18 in the vertical direction, and is opened on the above-described upper surface 23a. Both supporting portions 22a and 22b are provided in positions to oppose so as to sandwich the through-hole 24 therebetween. The upper end portion of the lock cylinder 20 extends through the interior of the through-hole 24.

Figure 5:
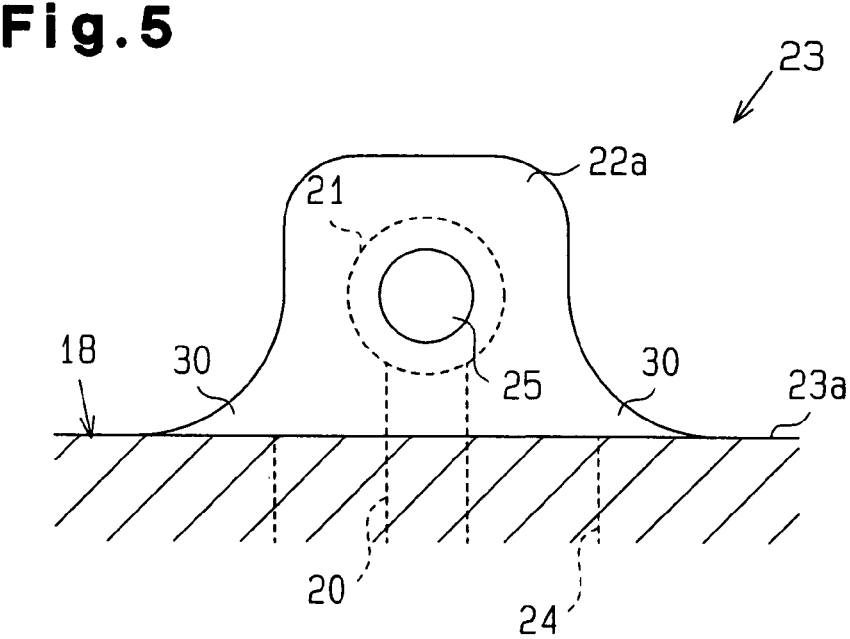
FIG. 5 is a schematic front view showing the supporting portion.

As shown in FIGS. 4 and 5, each supporting portion 22a, 22b is shaped substantially like a plate having thickness in the fore-and-aft direction of the vehicle and length in the widthwise direction thereof. Also, a proximal portion of each supporting portion 22a, 22b has a curved portion 30 that widens toward an end such that each supporting portion 22a, 22b is smoothly connected to the counterweight 18. The curved portion 30 makes flowing of molten metal excellent during casting of the counterweight 18, and also functions to restrain stress concentration at the proximal end portion of each supporting portion 22a, 22b to the utmost for increasing the structural strength as much as possible.

In the both supporting portions 22a and 22b, there is supported a coupling shaft 25 for supporting the lock cylinder 20 in a state of extending in the fore-and-aft direction of the vehicle. The coupling shaft 25 is inserted through the cylindrical portion 21 of the lock cylinder 20 which is inserted through the through-hole 24 and is arranged between both supporting portions 22a and 22b. The coupling shaft 25 pivotably supports the lock cylinder 20 within a plane substantially perpendicular to the fore-and-aft direction of the vehicle.

Figure 6:
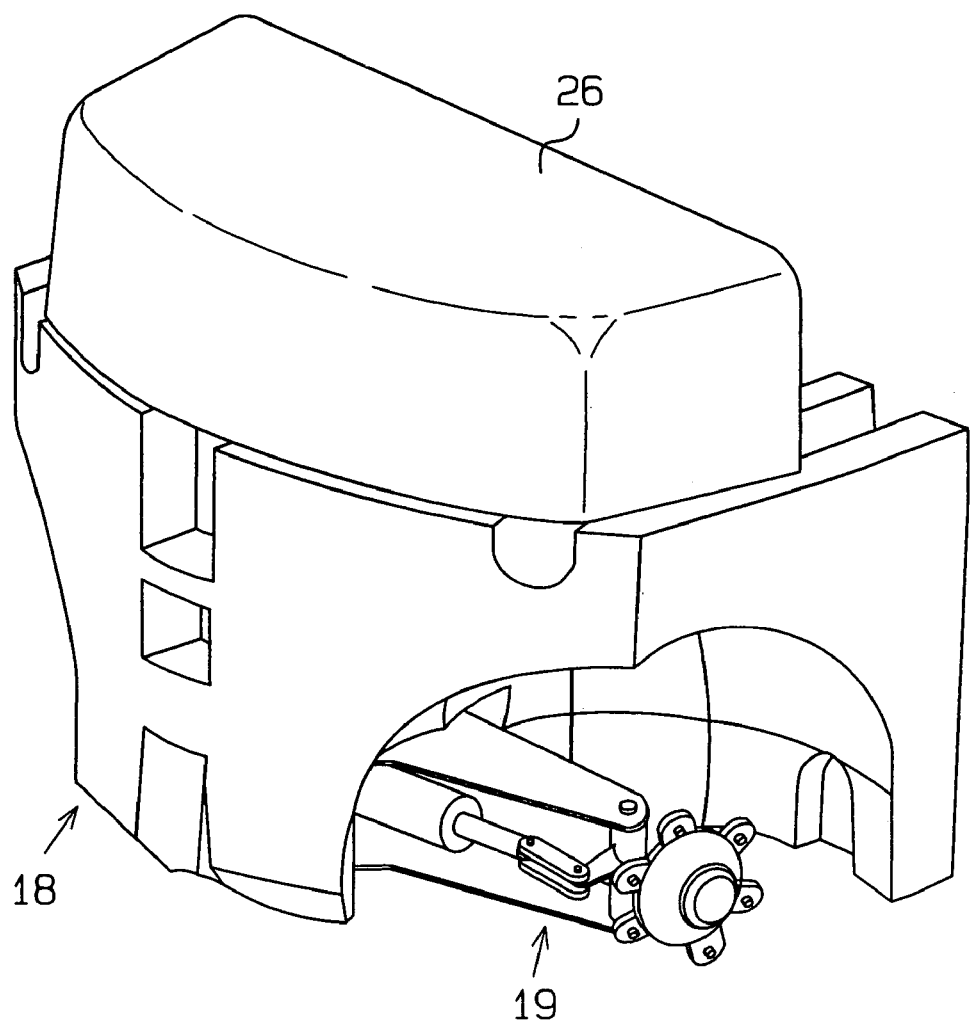
FIG. 6 is a schematic perspective view showing a cover and a counterweight.

As shown in FIG. 6, above the counterweight 18, there is provided a cover 26 which covers the accommodation recess 23 from the outside and constitutes an upper side of the rear part of the vehicle body 11. The cover 26 covers the substantially entire upper side of the counterweight 18. The cover 26 covers the accommodation recess 23, whereby both supporting portions 22a and 22b are protected from the outside. Also, the cover 26 protects the radiator and muffler from the outside which are arranged within the accommodation recess 23 and are not shown.

The cover 26 is coupled with, for example, the rear part of the cabin 15 by means of a hinge (not shown). The cover 26 is rotated with the hinge as a center of rotation so as to spring up on the front side of the vehicle from a state in which the accommodation recess 23 is covered to enter a state in which the interior of the accommodation recess 23 is not covered. In the state in which the accommodation recess 23 is not covered with the cover 26, it is possible to inspect and maintain the cylindrical portion 21 of the lock cylinder 20, both supporting portions 22a and 22b and the coupling shaft 25 which have been exposed to the outside.

The present embodiment that has been described above in detail has each of the following advantages.

(1) The rear part of the vehicle body 11 is formed by the counterweight 18, and the rear wheel axle 19 and the lock cylinder 20 are supported by the counterweight 18. The lock cylinder 20 is coupled with both supporting portions 22a and 22b which have been integrally formed with the integrally-cast counterweight 18 having high rigidity.

Figure 7:
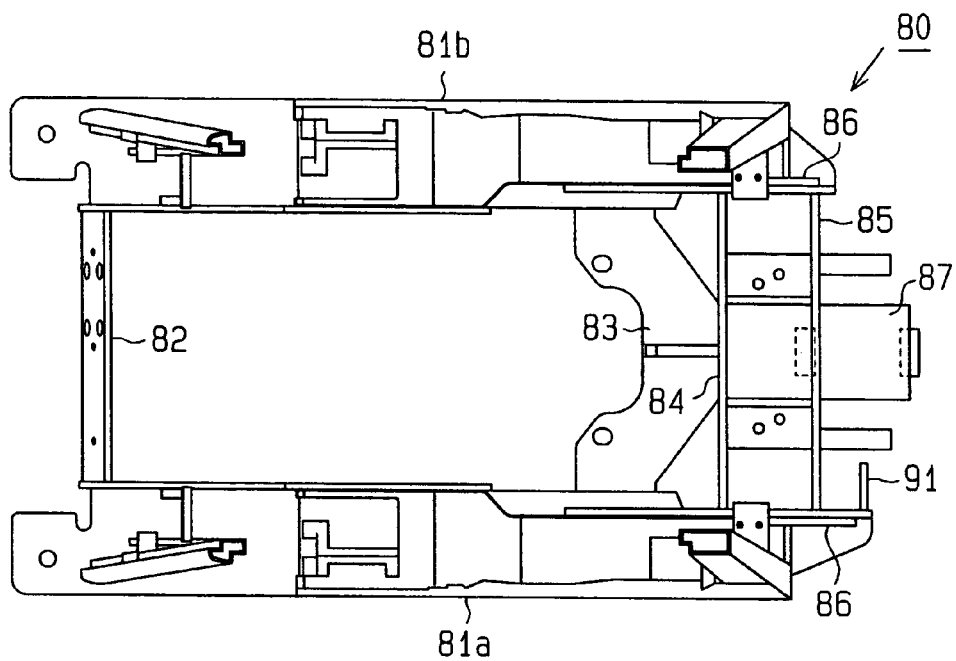
FIG. 7 is a schematic plan view showing a prior art body frame.
Figure 8:
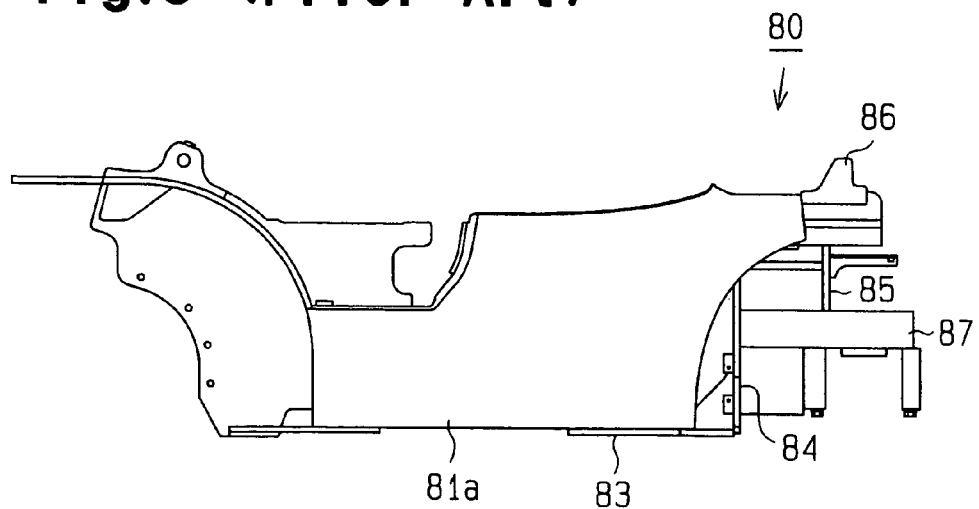
FIG. 8 is a schematic side view showing the prior art body frame.
Figure 9:
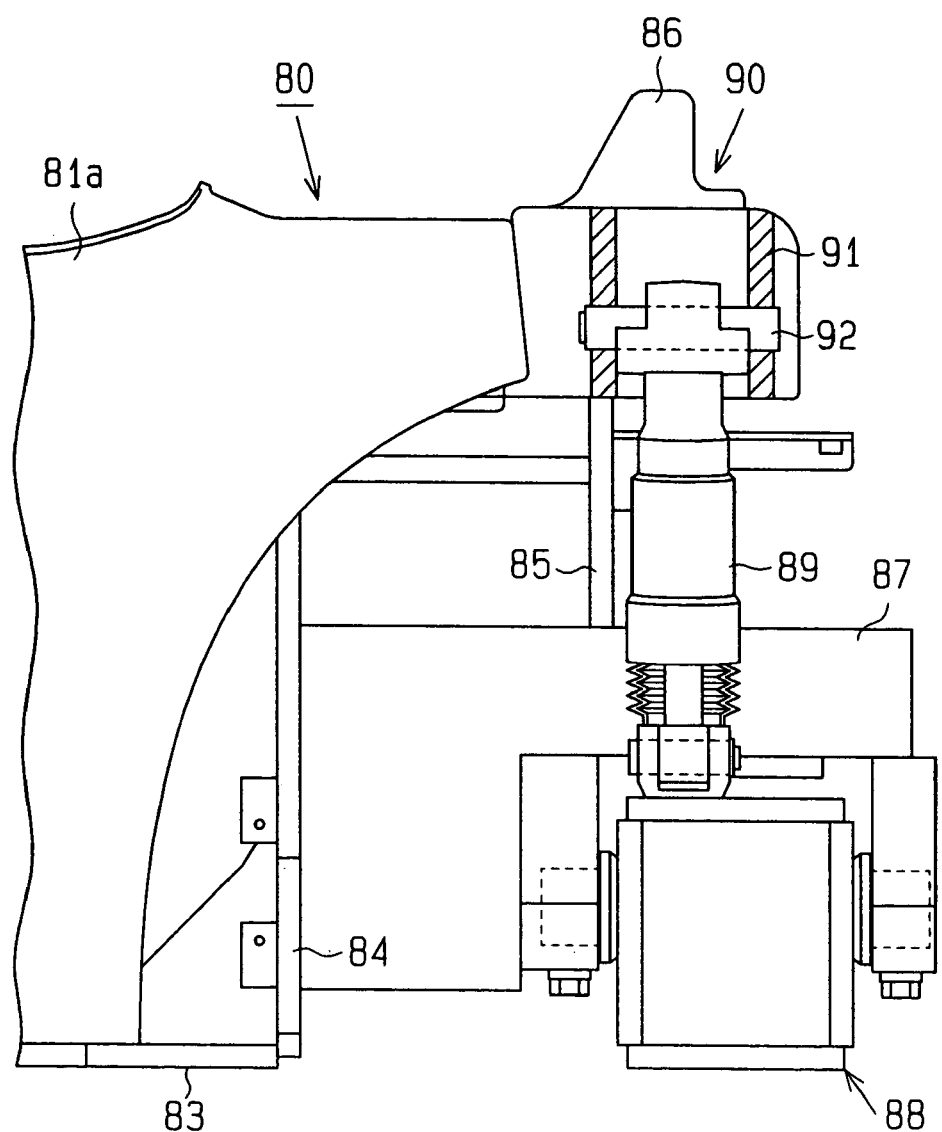
FIG. 9 is a schematic partial sectional view showing a rear portion of the body frame.

Therefore, unlike the prior art body frame 80 shown in FIGS. 7 to 9, there is no need for plate members and reinforcement which form the coupling portion 90 for coupling the lock cylinder 89, but an assembly operation for welding these plate members and reinforcement to the body frame 80 is unnecessary.

As a result, since it is possible to eliminate welding points for providing the coupling portion and to simplify the body structure, the durability of the vehicle body 11 will be improved. Also, since the number of components and the manufacturing steps can be reduced, for example, the manufacturing cost can be reduced.

(2) Both supporting portions 22a and 22b are provided so as to be exposed in an upper part of the counterweight 18. For this reason, even when, for example, lubricating oil is replenished to the coupling shaft 25 supported by both supporting portions 22a and 22b, and between the cylindrical portion 21 of the lock cylinder 20 and the coupling shaft 25, there is no need for the removal of the counterweight form the body frame unlike the conventional body structure. Therefore, it becomes easier to maintain and inspect the coupling portion between the counterweight 18 and the lock cylinder 20.

(3) There is provided the cover 26 for covering both supporting portions 22a and 22b and constituting the upper side of the rear part of the vehicle body 11. For this reason, while protecting the coupling portion between the counterweight 18 and the lock cylinder 20 from external environment, it is possible to maintain and inspect the coupling portion only by removing the cover 26.

(4) The pair of supporting portions 22a and 22b have the curved portion 30, respectively. For this reason, stress concentration at the proximal end portion of each supporting portion 22a, 22b is restrained so that the structural strength is further increased to improve the durability of the vehicle body 11. Moreover, flowing of molten metal to each supporting portion 22a, 22b is made excellent during casting of the counterweight 18.

(5) Above the counterweight 18, there is provided the cover 26 for covering the accommodation recess 23 and constituting the upper side of the rear part of the vehicle body 11. Therefore, since the upper side of the rear part of the vehicle body which has conventionally been formed by the counterweight can be formed by the cover 26 made of synthetic resin or metal, putty finishing on the counterweight becomes unnecessary.

Next, the above-described embodiment may be modified as described below.

In place of the lock cylinder 20 as the fluid pressure cylinder, there may be used a damper for restraining a pivoting velocity of the rear wheel axle 19 with respect to the vehicle body 11.

In place of the double-acting type lock cylinder 20 for regulating rotation of the rear wheel axle with respect to the vehicle body in both directions, there may be provided a pair of single-acting type lock cylinder for regulating rotation to one or the other, respectively.

The structure may be arranged such that the coupling portion between the lock cylinder 20 and the counterweight 18 is not exposed above the counterweight 18. In this case, the cover 26 covers only the radiator and the muffler.

In place of the engine type counterbalanced forklift, a battery type may be adopted. In this case, in the accommodation recess 23 of the counterweight 18, there is arranged a controller for controlling a motor for running and a motor for loading and unloading.

The present invention may be applied to not only the counterbalanced forklift, but also a counterbalanced industrial vehicle having working attachments other than forks, such as for example, clamp, push-pull, ram and crane, and having a lock cylinder for regulating pivoting of the rear wheel axle for pivotably supporting.

The present invention may be applied to a shovel loader equipped with a counter weight.

The present examples and embodiments are to be considered as illustrative and not restrictive and the invention is not to be limited to the details given herein, but may be modified within the scope and equivalence of the appended claims.

The invention claimed is:

1. An industrial vehicle, comprising;
   a vehicle body;
   a pair of rear wheels;
   a rear axle for supporting the rear wheels, wherein the rear axle is supported to be pivotable relative to the vehicle body;
   a fluid pressure cylinder located between the vehicle body and the rear axle, wherein the fluid pressure cylinder limits pivoting of the rear axle;
   a counterweight forming a rear portion of the vehicle body, wherein the counter weight supports the rear axle; and
   a coupling portion, which is integrally formed with the counterweight to couple the fluid pressure cylinder with the vehicle body.

2. The industrial vehicle according to claim 1, wherein the coupling portion is exposed in an upper part of the counterweight.

3. The industrial vehicle according to claim 2, further comprising a cover forming part of the vehicle body, wherein the cover covers the coupling portion.

4. The industrial vehicle according to claim 3, wherein the counterweight has an accommodation recess that opens upward and accommodates the coupling portion, wherein the coupling portion projects upward from a bottom surface of the accommodation recess, and wherein the cover covers substantially the entire accommodation recess.

5. The industrial vehicle according to claim 2, wherein the counterweight has a hole through which the fluid pressure cylinder extends such that the fluid pressure cylinder is coupled to the coupling portion.

6. The industrial vehicle according to claim 5, wherein the coupling portion includes a pair of supporting portions and a shaft, wherein the supporting portions face each other with the hole in between, and wherein the shaft extends between the supporting portions and is coupled with the fluid pressure cylinder.

7. The industrial vehicle according to claim 1, wherein a proximal portion of the coupling portion widens toward an end such that the coupling portion is smoothly connected to the counterweight.

8. An industrial vehicle, comprising;
   a vehicle body, wherein a rear portion of the vehicle body is formed with a counterweight;
   a pair of rear wheels;
   a rear axle for supporting the rear wheels, wherein the rear axle is supported to be pivotable relative to the counterweight;
   a fluid pressure cylinder located between the counterweight and the rear axle, wherein the fluid pressure cylinder limits pivoting of the rear axle; and
   a coupling portion, which is integrally formed with the counterweight to couple the fluid pressure cylinder with the counterweight.

9. The industrial vehicle according to claim 8, wherein the coupling portion is exposed in an upper part of the counterweight.

10. The industrial vehicle according to claim 9, further comprising a cover forming part of the vehicle body, wherein the cover covers the coupling portion.

11. The industrial vehicle according to claim 10, wherein the counterweight has an accommodation recess that opens upward and accommodates the coupling portion, wherein the coupling portion projects upward from a bottom surface of the accommodation recess, and wherein the cover covers substantially the entire accommodation recess.

12. The industrial vehicle according to claim 9, wherein the counterweight has a hole through which the fluid pressure cylinder extends such that the fluid pressure cylinder is coupled to the coupling portion.

13. The industrial vehicle according to claim 12, wherein the coupling portion includes a pair of supporting portions and a shaft, wherein the supporting portions face each other with the hole in between, and wherein the shaft extends between the supporting portions and is coupled with the fluid pressure cylinder.

14. The industrial vehicle according to claim 8, wherein a proximal portion of the coupling portion widens toward an end such that the coupling portion is smoothly connected to the counterweight.

* * * * *

UNITED STATES PATENT AND TRADEMARK OFFICE
CERTIFICATE OF CORRECTION

| | | |
|---|---|---|
| PATENT NO. | : 7,097,186 B2 | |
| APPLICATION NO. | : 10/798813 | |
| DATED | : August 29, 2006 | |
| INVENTOR(S) | : Shuo Uematsu et al. | |

It is certified that error appears in the above-identified patent and that said Letters Patent is hereby corrected as shown below:

Column 4, line 60, please delete "form the body" and insert therefor --from the body--;

Signed and Sealed this

Eighth Day of July, 2008

JON W. DUDAS
*Director of the United States Patent and Trademark Office*